(12) United States Patent
Hori et al.

(10) Patent No.: US 10,570,979 B2
(45) Date of Patent: Feb. 25, 2020

(54) HIGH AL-CONTENT VIBRATION-DAMPING FERRITIC STAINLESS STEEL MATERIAL, AND PRODUCTION METHOD

(71) Applicant: NISSHIN STEEL CO., LTD., Tokyo (JP)

(72) Inventors: Yoshiaki Hori, Tokyo (JP); Kazunari Imakawa, Tokyo (JP); Satoshi Suzuki, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 174 days.

(21) Appl. No.: 15/751,917

(22) PCT Filed: Aug. 10, 2016

(86) PCT No.: PCT/JP2016/073547
§ 371 (c)(1),
(2) Date: Feb. 12, 2018

(87) PCT Pub. No.: WO2017/030064
PCT Pub. Date: Feb. 23, 2017

(65) Prior Publication Data
US 2018/0238410 A1    Aug. 23, 2018

(30) Foreign Application Priority Data
Aug. 17, 2015    (JP) ................. 2015-160307

(51) Int. Cl.
*C22C 38/06*    (2006.01)
*F16F 7/00*    (2006.01)
(Continued)

(52) U.S. Cl.
CPC ............... *F16F 7/00* (2013.01); *C21D 6/00* (2013.01); *C21D 6/004* (2013.01); *C21D 8/0473* (2013.01);
(Continued)

(58) Field of Classification Search
CPC ......... F16F 7/00; C21D 6/00; C21D 2201/04; C21D 2211/005; C21D 9/46;
(Continued)

(56) References Cited

U.S. PATENT DOCUMENTS

| | | | |
|---|---|---|---|
| 9,932,650 B2* | 4/2018 | Oku ............... | B23K 35/308 |
| 2001/0013382 A1* | 8/2001 | Yoshitake ........... | C21D 8/0215 148/325 |

(Continued)

FOREIGN PATENT DOCUMENTS

| | | |
|---|---|---|
| JP | 51-6120 | 1/1976 |
| JP | 51-120921 | 10/1976 |

(Continued)

*Primary Examiner* — Jonathan C Langman
(74) *Attorney, Agent, or Firm* — Clark & Brody

(57) ABSTRACT

A ferritic stainless steel material excellent in vibration damping capability has a composition containing, by mass %, from 0.001 to 0.04% of C, from 0.1 to 2.0% of Si, from 0.1 to 1.0% of Mn, from 0.01 to 0.6% of Ni, from 10.5 to 20.0% of Cr, from 0.5 to 5.0% of Al, from 0.001 to 0.03% of N, from 0 to 0.8% of Nb, from 0 to 0.5% of Ti, from 0 to 0.3% of Cu, from 0 to 0.3% of Mo, from 0 to 0.3% of V, from 0 to 0.3% of Zr, from 0 to 0.6% of Co, from 0 to 0.1% of REM, from 0 to 0.1% of Ca, the balance of Fe and unavoidable impurities, and has ferrite single phase matrix with crystal grains of average crystal grain diameter of from 0.3 to 3.0 mm and a residual magnetic flux density of 45 mT or less.

4 Claims, 1 Drawing Sheet

(51) Int. Cl.
    *C21D 8/04* (2006.01)
    *C22C 38/04* (2006.01)
    *C22C 38/00* (2006.01)
    *C21D 6/00* (2006.01)
    *C22C 38/02* (2006.01)
    *C22C 38/40* (2006.01)
    *C21D 9/46* (2006.01)

(52) U.S. Cl.
    CPC ............ *C22C 38/00* (2013.01); *C22C 38/001* (2013.01); *C22C 38/02* (2013.01); *C22C 38/04* (2013.01); *C22C 38/06* (2013.01); *C21D 6/005* (2013.01); *C21D 9/46* (2013.01); *C21D 2211/005* (2013.01); *C22C 38/40* (2013.01)

(58) Field of Classification Search
    CPC ...... C21D 8/0473; C21D 6/004; C21D 6/005; C21D 6/007; C21D 6/008; C21D 8/0273; C22C 38/00; C22C 38/001; C22C 38/005; C22C 38/02; C22C 38/06; C22C 38/42; C22C 38/44; C22C 38/46; C22C 38/48; C22C 38/50; C22C 38/58; C22C 38/52; C22C 38/04; C22C 38/40; Y02P 10/212
    See application file for complete search history.

(56) References Cited

U.S. PATENT DOCUMENTS

2003/0192626 A1* 10/2003 Takiguchi ............... C22C 38/06
                                                                148/405
2008/0279712 A1* 11/2008 Oku ........................ C22C 38/20
                                                                420/61
2012/0111529 A1*  5/2012 Oku ...................... C22C 38/001
                                                                165/41

FOREIGN PATENT DOCUMENTS

| JP | 52-73118 | 6/1977 |
|---|---|---|
| JP | 54-141315 | 11/1979 |
| JP | 56-035717 | 4/1981 |
| JP | 4-110449 | 4/1992 |
| JP | 8-176750 | 7/1996 |
| JP | 10-072643 | 3/1998 |
| JP | 10-280102 | 10/1998 |
| JP | 2002-275586 | 9/2002 |
| JP | 2002-294408 | 10/2002 |
| JP | 2007-254880 | 10/2007 |
| JP | 2011-241438 | 12/2011 |

* cited by examiner

[Fig.1]
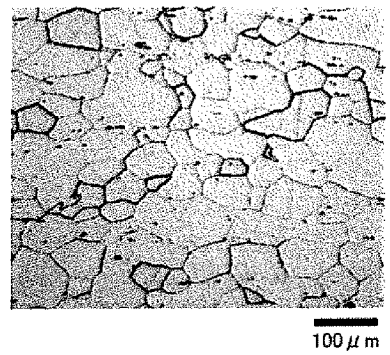
[Fig.2]
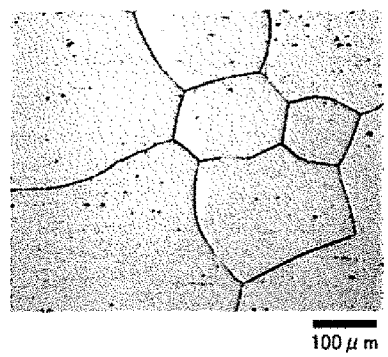
[Fig.3]
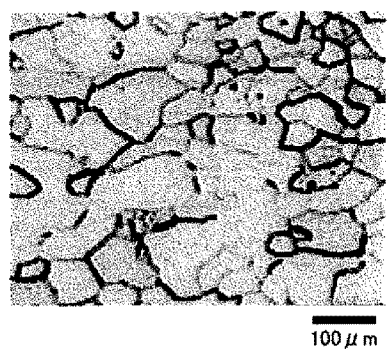
[Fig.4]
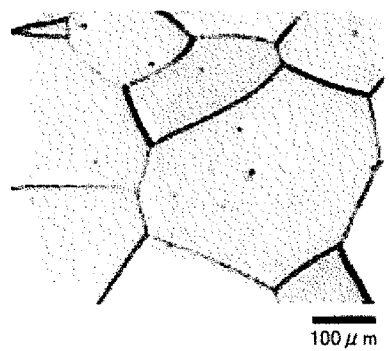

HIGH AL-CONTENT VIBRATION-DAMPING FERRITIC STAINLESS STEEL MATERIAL, AND PRODUCTION METHOD

TECHNICAL FIELD

The present invention relates to a high Al-content vibration-damping ferritic stainless steel material that exhibits a ferromagnetic vibration damping mechanism, and a production method therefor.

BACKGROUND ART

An exhaust gas flow pipe constituting an automobile exhaust gas flow path member, and a heat shield cover therefor are demanded to have salt corrosion resistance in addition to heat resistance, and therefore a ferritic stainless steel excellent in heat resistance has been frequently used. Vibrations from an engine reach the exhaust gas flow pipe, and noises caused by the vibrations may become a problem. In recent years, members of an automobile are demanded to have light weights for improving the fuel efficiency. The reduction in thickness of the exhaust gas flow pipe for reducing the weight tends to further increase the noises due to the vibrations. Furthermore, the vibrations from the engine occurring in the heat shield cover may cause muffled sound, so as to be an offensive noise source in some cases. There is a demand of a heat resistant stainless steel material that is excellent in capability of suppressing vibrations and noises from an exhaust gas flow pipe. Furthermore, there is a large demand for improvement of the vibration damping capability of a ferritic stainless steel material not exclusively for the automobile heat resistant member.

The mechanisms attenuating vibration energy applied externally to a metal single material are classified into a eutectic type, a dislocation type, a ferromagnetic type, a composite type, and others. A steel material having a ferrite phase as the matrix (metal basis material) is a ferromagnetic material, and thus various vibration damping materials utilizing a ferromagnetic vibration damping mechanism have been proposed.

For example, PTL 1 shows an example, in which a vibration damping capability is imparted to a steel material containing Cr. There is described that Cr has a function of enhancing the vibration damping characteristics, and the effect of the addition thereof is increased up to 20.0% by weight (paragraph 0026). However, the Cr content of the specific examples shown as the examples is 3.08% at most.

PTL 2 shows a technique of imparting a vibration damping capability by using a steel material containing large amounts of Si and Co. It is taught that Cr has a significant effect of enhancing the magnetostrictive, but decreases the loss factor when the content thereof exceeds 9% (paragraph 0015).

PTL 3 describes a technique of imparting a vibration damping capability by controlling the crystal grain diameter, the maximum specific magnetic permeability, and the residual magnetic flux density without addition of alloy elements, such as Al, Si, and Cr, in large amounts. There is described that the crystal grain diameter is 300 μm or less in consideration of the surface roughening in processing (paragraph 0023).

PTL 4 describes that a vibration damping capability is imparted by using an iron alloy containing Cr and Ga in large amounts.

CITATION LIST

Patent Literatures

PTL 1: JP-A-10-72643
PTL 2: JP-A-2002-294408
PTL 3: JP-A-2007-254880
PTL 4: JP-A-2011-241438

SUMMARY OF INVENTION

Technical Problem

As described in the patent literatures, it has been said that Cr is effective for enhancing the vibration damping capability of the steel material. However, no technique has been established for improving the vibration damping capability in a steel material using a high Cr content steel, such as a ferritic stainless steel. In particular, in steel materials having heat resistance capable of withstanding a long term use at a high temperature, such as several hundreds of degrees centigrade or more, such a material has not yet been found that is imparted with an excellent vibration damping capability providing a loss factor t of 0.0070 or more at ordinary temperature by the central exciting method according to JIS K7391:2008 at resonance peaks observed in a range of from 10 to 10,000 Hz.

The invention is to provide a ferritic stainless steel material having both excellent heat resistance capable of being used at a high temperature, such as several hundreds of degrees centigrade or more, and an excellent vibration damping capability.

Solution to Problem

According to the detailed investigations made by the present inventors, it has been found that for imparting an excellent vibration damping capability by the ferromagnetic vibration damping mechanism to a ferritic stainless steel material, it is significantly effective that the steel material is worked into a prescribed shape and then heated at a high temperature to provide an extremely large average crystal grain diameter of 0.3 mm or more in final annealing. It has also been found that the vibration damping capability is significantly enhanced by the combined addition of Cr and Al. The invention has been accomplished based on the knowledge.

The object can be achieved by a vibration-damping ferritic stainless steel material having a chemical composition containing, in terms of percentage by mass, from 0.001 to 0.04% of C, from 0.1 to 2.0% of Si, from 0.1 to 1.0% of Mn, from 0.01 to 0.6% of Ni, from 10.5 to 20.0% of Cr, from 0.5 to 5.0% of Al, from 0.001 to 0.03% of N, from 0 to 0.8% of Nb, from 0 to 0.5% of Ti, from 0 to 0.3% of Cu, from 0 to 0.3% of Mo, from 0 to 0.3% of V, from 0 to 0.3% of Zr, from 0 to 0.6% of Co, from 0 to 0.1% of REM (rare earth element), from 0 to 0.1% of Ca, and the balance of Fe, with unavoidable impurities, having a metal structure containing a ferrite single phase as a matrix and ferrite crystal grains having an average crystal grain diameter of from 0.3 to 3.0 mm, and having a residual magnetic flux density of 45 mT or less.

Herein, the elements, Nb, Ti, Cu, Mo, V, Zr, Co, REM (rare earth element), and Ca, each are an element that is optionally added. The REM includes Sc, Y, and lanthanoid elements.

As a production method for the vibration-damping ferritic stainless steel material, there is provided a production method containing subjecting a steel material having the chemical composition to final annealing in a non-oxidative atmosphere under a condition of retaining the steel material in a temperature range of from 900 to 1,250° C. for 10 minutes or more, so as to make an average crystal grain diameter of ferrite crystal grains of from 0.3 to 3.0 mm.

In the production method, the atmosphere for the final annealing may be an air atmosphere instead of the non-oxidative atmosphere. In this case, the steel material is subjected to acid cleaning after the final annealing. The steel material subjected to the final annealing may be a steel material obtained by working a steel sheet material. In this case, the sheet thickness of the steel sheet used (i.e., the thickness of the steel material subjected to the final annealing) may be, for example, from 0.2 to 3.0 mm.

Advantageous Effects of Invention

According to the invention, an excellent vibration damping capability utilizing a ferromagnetic vibration damping mechanism can be imparted to a ferritic stainless steel material. The level of the vibration damping capability is, for example, a loss factor η of 0.0070 or more at ordinary temperature by the central exciting method according to JIS K7391:2008 at the resonance peaks observed in a range of from 10 to 10,000 Hz, and the loss factor that is evaluated in terms of the average value of the values η at the resonance peaks can be a value of 0.01 or more. Due to the use of the high Al-content ferritic stainless steel, the steel material is excellent in high temperature oxidation resistance, and can exhibit a vibration damping capability at up to a high temperature range exceeding 700° C. Metal materials excellent in vibration dumping capability have been known for non-ferrous alloys, such as a Cu—Mn-based alloy, which however cannot be used at a high temperature. Furthermore, ordinarily known steel materials having a vibration damping capability imparted thereto are inferior in corrosion resistance and heat resistance to the steel material of the invention. The invention contributes, for example, to vibration damping of an automobile exhaust gas system.

BRIEF DESCRIPTION OF DRAWINGS

FIG. 1 is the optical micrograph of the metal structure of Comparative Example No. 1.

FIG. 2 is the optical micrograph of the metal structure of Comparative Example No. 2.

FIG. 3 is the optical micrograph of the metal structure of Comparative Example No. 3.

FIG. 4 is the optical micrograph of the metal structure of Example No. 4 of the invention.

DESCRIPTION OF EMBODIMENTS

Type of Steel Applied

In the invention, in ferritic stainless steel capable of providing a matrix (metal basis material) formed of a ferrite single phase at ordinary temperature, particularly a high Al-content ferritic stainless steel having an Al content of from 0.5 to 5.0% by mass is applied. The combined addition of Cr and a large amount of Al can significantly enhance the level of the vibration damping capability. The mechanism of the enhancement of the vibration damping capability is not yet clarified at the present time.

The contents of the alloy components may be determined within the aforementioned ranges. While P and S are unavoidable impurities, the P content may be allowed up to 0.040%, and the S content may be allowed up to 0.030%.

Examples of the steel types having particularly high heat resistance include the following compositional range (A).

(A) A steel containing, in terms of percentage by mass, from 0.001 to 0.03% of C, from 0.1 to 1.0% of Si, from 0.1 to 1.0% of Mn, from 0.01 to 0.6% of Ni, from 17.5 to 19.0% of Cr, from 2.5 to 4.0% of Al, from 0.001 to 0.03% of N, from 0 to 0.3% of Nb, from 0.1 to 0.3% of Ti, from 0 to 0.3% of Cu, from 0 to 0.3% of Mo, from 0 to 0.3% of V, from 0 to 0.3% of Zr, from 0 to 0.6% of Co, from 0 to 0.1% of REM (rare earth element), from 0 to 0.1% of Ca, and the balance of Fe, with unavoidable impurities.

Metal Structure

In the steel material according to the invention, it is important that the average crystal grain diameter of the ferrite recrystallized grains constituting the matrix (metal basis material) is as extremely large as from 0.3 to 3.0 mm. The average crystal grain diameter is more preferably 0.35 mm or more. A ferromagnetic vibration damping material absorbs vibration energy through migration of magnetic domain walls. The crystal grain boundary becomes a barrier preventing the migration of magnetic domain walls, and therefore it is generally said that a large crystal grain diameter is advantageous for enhancing the vibration damping capability. However, in the case of a ferritic stainless steel material, a good vibration damping capability often cannot be obtained with an average crystal grain diameter of approximately 100 µm, and a measure for stably imparting a high vibration damping capability has not been clarified. As a result of various investigations by the inventors, it has been found that the vibration damping capability of the ferritic stainless steel material is enhanced by extremely increasing the average crystal grain diameter thereof to 0.3 mm or more. While the mechanism thereof is not clear at the present time, it is considered that the ferrite recrystallized grains constituting the matrix of the ferritic stainless steel material include grains having large sizes and grains having small sizes mixed with each other, and the small grains among these disadvantageously affect the migration of the magnetic domain walls. It is estimated that the heat treatment is performed to make the average crystal grain diameter as extremely large as 0.3 mm or more, more preferably 0.35 mm or more, so as to grow the recrystallized grains having small sizes to sizes that do not prevent the migration of the magnetic domain walls, resulting in the enhancement of the vibration damping mechanism over the entire steel material.

The average crystal grain diameter can be measured by the optical microscope observation of the cross section according to the intercept method. According to the method described in JIS G0551:2003, a straight line is drawn at an arbitrary position on the image of the optical micrograph, and the number of the intersection points of the straight line and the crystal grain boundaries is counted, from which an average segment length is calculated. The observation is performed for 20 or more in total of straight lines with plural observation view fields. The ferritic stainless steel material having an average crystal grain diameter measured in this method that is 0.3 mm or more exhibits an excellent vibration damping capability. The average crystal grain diameter is more preferably 1.0 mm or more. The steel material having been finished for the working to the shape of the member is subjected to the final annealing described later to grow the crystal grains, and thereby the adverse effect of the coarse crystal grains to the workability can be avoided. The large crystal grains are advantageous from the standpoint of the high temperature creep resistance. However, an excessive increase of the crystal grains may increase the load of the final annealing, which is economically disadvantageous. The average crystal grain diameter suffices to be in a range of 3.0 mm or less, and may be managed to 2.5 mm or less.

Magnetic Characteristics For smoothly performing the migration of the magnetic domain walls, it is also important that the ferrite crystal lattice has a small strain. The extent of the strain in the crystal is reflected to the residual magnetic flux density in the magnetic characteristics. Specifically, assuming materials having the same composition, it can be evaluated that a material having a smaller residual magnetic flux density has a small strain of the crystal lattice. According to the studies by the inventors, a good vibration damping capability can be obtained in a ferritic stainless steel material having a residual magnetic flux density that is 45 mT (450 G) or less at ordinary temperature. The residual magnetic flux density is more preferably 30 mT (300 G) or less. The lower limit thereof is not particularly determined, and is generally 12 mT (120 G) or more.

As other magnetic characteristics, the coercive force is desirably 400 A/m (approximately 5 Oe) or less. The maximum magnetic flux density is desirably 450 mT (4,500 G) or more, and more preferably 520 mT (5,200 G) or more.

Production Method

In the invention, the ferrite recrystallized grains are grown in the final annealing of the ferritic stainless steel material, so as to impart a vibration damping capability thereto.

The process used for providing the steel material for being subjected to the final annealing may be an ordinary production process. For example, a cold rolled annealed acid-cleaned steel sheet or a temper rolling finished steel sheet of a ferritic stainless steel produced by an ordinary method as a raw material is worked into a prescribed member. Examples of the working to the member include various kinds of press work using a mold, bending work, welding work, and the like.

The steel material having been worked into the member is subjected to the final annealing. The material is heated and retained in a temperature range of from 900 to 1,250° C., so as to grow the recrystallized grains to have an average crystal grain diameter of the ferrite crystal grains of from 0.3 to 3.0 mm, and more preferably from 0.35 to 3.0 mm. The retention time in the aforementioned temperature range (i.e., the period of time where the material temperature is in the temperature range) is ensured to be such a period of time that is capable of growing the ferrite crystal grains to the aforementioned average crystal grain diameter, corresponding to the chemical composition and the degree of working of the steel material subjected to the final annealing. However, when the retention time is too short, the enhancement of the vibration damping capability may be insufficient due to shortage in homogenization in some cases. As a result of various investigations, the retention time is preferably ensured to be 10 minutes or more. The retention time is more preferably 50 minutes or more, and further preferably 100 minutes or more. However, a too long retention time is economically disadvantageous. The retention time at the aforementioned temperature may be set in a range of 300 minutes or less, and may also be a range of 200 minutes or less. The appropriate retention temperature and retention time can be comprehended in advance by a preliminary experiment corresponding to the chemical composition and the degree of working of the steel material.

In a cooling step after retaining in the aforementioned temperature range, quenching is preferably avoided to prevent strain in the crystal due to thermal contraction associated with cooling from being introduced. As a result of various investigations, it is effective that the maximum cooling rate of from the maximum attaining temperature, which is in a range of from 900 to 1,250° C., to 200° C. is controlled to 5° C./sec or less. When the cooling rate is too slow, on the other hand, aging precipitation may occur in a temperature range during cooling in some cases, and the precipitated phase may be a factor impairing the migration of the magnetic domain walls through the formation of a strain field in the crystal. Therefore, it is preferred to avoid excessively slow cooling. For example, it is effective that the average cooling rate of from 850° C. to 400° C. is 0.3° C./sec or more.

In view of the above, examples of the more preferred condition for the final annealing taking the cooling rate into consideration include a condition of retaining the steel material in a temperature range of from 900 to 1,250° C. for 10 minutes or more, so as to make an average crystal grain diameter of ferrite crystal grains of from 0.5 to 3.0 mm, and then cooling to a temperature of 200° C. or less at a maximum cooling rate of from a maximum attaining material temperature to 200° C. of 5° C./sec or less and an average cooling rate of from 850° C. to 400° C. of 0.3° C./sec or more.

The final annealing is desirably performed in a non-oxidative atmosphere. Examples thereof include vacuum annealing. In this case, the interior of the furnace is vacuumed to a depressurized state (vacuum atmosphere), for example, of approximately $1 \times 10^{-2}$ Pa or less, and therein, the steel material is heated to and retained in the aforementioned temperature range. In the cooling step, the cooling rate can be controlled, for example, by controlling the introduction amount of an inert gas, and the like. The final annealing may be performed in a reductive atmosphere containing hydrogen. The final annealing may be performed in an air atmosphere, and in this case, a post-treatment, such as acid cleaning, is necessarily performed for removing oxidized scale.

In the case where a flat plate member is to be provided, such a method may be employed that a cold rolled annealed steel sheet in a coil form is directly placed in an annealing furnace and subjected to the final annealing, and then cut into a prescribed dimension.

EXAMPLES

The steels shown in Table 1 were made, from which cold rolled annealed acid-cleaned steel sheets having a sheet thickness of 1.5 mm were obtained according to an ordinary method. Specimens collected from the steel sheets were subjected to final annealing under the conditions shown in Table 2 except for a part of Comparative Examples (Nos. 1 and 3). The method of the final annealing was vacuum annealing, and performed in the following manner. The specimen was placed in a sealable vessel, and in the state where the interior of the vessel was vacuumed to a pressure of approximately $1 \times 10^{-2}$ Pa or less, the specimen was heated and retained at the temperature (i.e., the maximum attaining temperature) shown in Table 2. Thereafter, after decreasing the temperature to 900° C., the specimen was cooled to a temperature of 400° C. or less by introducing argon gas to the vessel up to a pressure of approximately 90 kPa, and then exposed to the air after the temperature reached 200° C. or less. The cooling rate in the final annealing was controlled in such a manner that the maximum cooling rate of from a maximum attaining temperature to 200° C. was 5° C./sec or less, and the average cooling rate of from 850° C. to 400° C. was 0.3° C./sec or more.

The specimens were obtained in the aforementioned manners.

TABLE 1

| | Chemical composition (% by mass) | | | | | | | | | | |
|---|---|---|---|---|---|---|---|---|---|---|---|
| Steel | C | Si | Mn | Ni | Cr | Nb | Ti | Cu | Mo | Al | N | Note |
| E | 0.010 | 0.28 | 1.00 | 0.17 | 18.42 | 0.65 | — | 0.15 | 2.02 | 0.006 | 0.010 | comparative steel |
| N | 0.007 | 0.33 | 0.24 | 0.16 | 18.17 | — | 0.15 | 0.08 | 0.06 | 3.07 | 0.010 | steel for invention |

TABLE 2

| | | | Final annealing | | |
|---|---|---|---|---|---|
| Class | No. | Steel | Atmosphere | Temperature (° C.) | Time (min) |
| Comparative Example | 1 | E | — | — | — |
| Comparative Example | 2 | E | vacuum | 1200 | 120 |
| Comparative Example | 3 | N | — | — | — |
| Example of Invention | 4 | N | vacuum | 1100 | 60 |

The specimens were evaluated as follows.

Measurement of Average Crystal Grain Diameter

The metal structure of the cross section in parallel to the rolling direction and the sheet thickness direction (L cross section) was observed with an optical microscope, and the average crystal grain diameter was measured by the intercept method described previously.

The micrographs of the metal structures of Nos. 1, 2, 3, and 4 are exemplified in FIGS. 1, 2, 3, and 4, respectively.

Magnetism Measurement

A test piece of 250 mm×20 mm×t (t: sheet thickness, 1.5 mm) with a longitudinal direction directed in the rolling direction was subjected to a magnetism measurement with a direct current magnetism measurement device (B-H Curve Tracer, produced by Riken Denshi Co., Ltd.). The coil used was a solenoidal coil of 62.5 mm in diameter×160 mm and 100 turns. The maximum magnetic flux density Bm, the residual magnetic flux density Br, and the coercive force Hc were obtained from the resulting B-H curve.

Measurement of Loss Factor $\eta$

A test piece of 250 mm×20 mm×t (t: sheet thickness, 1.5 mm) with a longitudinal direction directed in the rolling direction was measured for the frequency response function at ordinary temperature by the central exciting method according to JIS K7391:2008, the half value width was read at the position decreased by 3 dB from the resonance peak of the resulting frequency response function, from which the value $\eta$ was calculated according to the expression (1) of JIS K7391:2008, and the average value of the values $\eta$ obtained for at the resonance peaks observed in a range of from 10 to 10,000 Hz was designated as the loss factor $\eta$ of the material.

The results are shown in Table 3.

TABLE 3

| | | | | Magnetic characteristics | | | | |
|---|---|---|---|---|---|---|---|---|
| | | | Average crystal grain | Maximum magnetic flux density | Residual magnetic flux density | Coercive force Hc | | Loss factor |
| Class | No. | Steel | diameter (mm) | Bm (mT) | Br (mT) | (Oe) | (A/m) | $\eta$ |
| Comparative Example | 1 | E | 0.025 | 534.5 | 30.23 | 3.414 | 271.7 | 0.0008 |
| Comparative Example | 2 | E | 1.52 | 543.0 | 25.40 | 2.802 | 223.0 | 0.0023 |
| Comparative Example | 3 | N | 0.050 | 476.7 | 49.4 | 4.670 | 371.6 | 0.0006 |
| Example of Invention | 4 | N | 0.68 | 504.5 | 22.8 | 1.925 | 153.2 | 0.0192 |

It is understood that the specimens of Comparative Example No. 2 and Example of Invention No. 4 obtained by performing the final annealing under the aforementioned appropriate condition have a small strain of the crystal lattice since the residual magnetic flux density is small. The average crystal grain diameter thereof is significantly large. For these specimens, enhancement of the loss factor $\eta$ is observed as compared to the specimens not subjected to the final annealing (comparison between No. 1 and No. 2, and comparison between No. 3 and No. 4). Example of Invention No. 4, to which Cr and a large amount of Al are added in combination, exhibits considerably large enhancement of the loss factor $\eta$ as compared to Comparative Example No. 2 having a small Al content.

In Example No. 4, seven resonance peaks were present in a frequency range of from 10 to 10,000 Hz, and assuming that the loss factors $\eta$ at the resonance peaks were $\eta_1, \eta_2, \ldots, \eta_7$ in this order from the low frequency side, the measured values thereof were as follows.

$\eta_1$=0.0387, $\eta_2$=0.0209, $\eta_3$=0.0105, $\eta_4$=0.0092, $\eta_5$=0.0087, $\eta_6$=0.0084, $\eta_7$=0.0082

The average value of these values is the value of the loss factor $\eta$ 0.0149 shown in Table 2. In the values $\eta_1$ to $\eta_7$, the values within the resonance frequency range of from 1,000 to 10,000 Hz are the five values $\eta_3$ to $\eta_7$.

Even in the case where Cr and a large amount of Al are added in combination, with the ordinary cold rolled annealed acid-cleaned material as it is, there is no tendency of increasing the vibration damping capability as compared to the steel types having a small Al content (comparison between Comparative Example No. 1 and Comparative Example No. 3). On the other hand, with the final annealing according to the invention performed, a large difference in enhancement of the vibration damping capability occurs, and the effect of the combined addition of Cr and a large amount of Al is manifested (comparison between Comparative Example No. 2 and Example of Invention No. 4). Furthermore, the combined addition of Cr and a large amount of Al provides a significant enhancement of the heat resistance (particularly the high temperature oxidation resistance).

The invention claimed is:

1. A vibration-damping ferritic stainless steel material having a chemical composition containing, in terms of percentage by mass, from 0.001 to 0.04% of C, from 0.1 to 2.0% of Si, from 0.1 to 1.0% of Mn, from 0.01 to 0.6% of Ni, from 10.5 to 20.0% of Cr, from 0.5 to 5.0% of Al, from 0.001 to 0.03% of N, from 0 to 0.8% of Nb, from 0 to 0.5% of Ti, from 0 to 0.3% of Cu, from 0 to 0.3% of Mo, from 0 to 0.3% of V, from 0 to 0.3% of Zr, from 0 to 0.6% of Co, from 0 to 0.1% of REM (rare earth element), from 0 to 0.1% of Ca, and the balance of Fe, with unavoidable impurities, having a metal structure containing a ferrite single phase as a matrix and ferrite crystal grains having an average crystal grain diameter of from 0.3 to 3.0 mm, and having a residual magnetic flux density of 45 mT or less.

2. A production method for a vibration-damping ferritic stainless steel material, comprising subjecting a steel material having a chemical composition containing, in terms of percentage by mass, from 0.001 to 0.04% of C, from 0.1 to 2.0% of Si, from 0.1 to 1.0% of Mn, from 0.01 to 0.6% of Ni, from 10.5 to 20.0% of Cr, from 0.5 to 5.0% of Al, from 0.001 to 0.03% of N, from 0 to 0.8% of Nb, from 0 to 0.5% of Ti, from 0 to 0.3% of Cu, from 0 to 0.3% of Mo, from 0 to 0.3% of V, from 0 to 0.3% of Zr, from 0 to 0.6% of Co, from 0 to 0.1% of REM (rare earth element), from 0 to 0.1% of Ca, and the balance of Fe, with unavoidable impurities, to final annealing in a non-oxidative atmosphere under a condition of retaining the steel material in a temperature range of from 900 to 1,250° C. for 10 minutes or more, so as to make an average crystal grain diameter of ferrite crystal grains of from 0.3 to 3.0 mm.

3. The production method for a vibration-damping ferritic stainless steel material according to claim 2, wherein the final annealing is performed in an air atmosphere instead of the non-oxidative atmosphere, and acid cleaning is performed after the final annealing.

4. The production method for a vibration-damping ferritic stainless steel material according to claim 2 or 3, wherein the steel material subjected to the final annealing is a steel material obtained by working a steel sheet material.

* * * * *